United States Patent Office 3,663,664
Patented May 16, 1972

3,663,664
OXIMINO ESTERS OF ORGANOPHOSPHORUS AND ORGANOTHIOPHOSPHORUS COMPOUNDS
Lawrence A. Retallick, Perry, Ohio, Lawrence E. Limpel, Yonkers, N.Y., and Henry Bluestone, University Heights, Ohio, assignors to Diamond Shamrock Corporation, Cleveland, Ohio
No Drawing. Filed May 5, 1969, Ser. No. 821,939
Int. Cl. C07f 9/06; A01n 9/36
U.S. Cl. 260—944
17 Claims

ABSTRACT OF THE DISCLOSURE

Novel oximino esters of para-substituted-phenyl phosphorus and thiophosphorus compounds have the formula

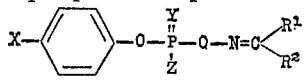

wherein X is nitro, cyano, azido, trihalomethyl, carboalkoxy or alkanesulfonyl; Y is O or S; $R^1$ and $R^2$ can be the same or different and are selected from the group consisting of H, alkyl radicals of 1–6 C atoms and phenyl; and Z is selected from the group consisting of alkyl and alkoxy radicals each having 1–6 C atoms, phenyl, Cl and

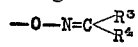

wherein $R^3$ and $R^4$ are as defined for $R^1$ and $R^2$. Many of these compounds are prepared by reacting an oxime with either a para-substituted-phenyl phosphorochloridate, a similarly substituted thiophosphorochloridate or phenylthiophosphonic chloride under alkaline conditions. Novel alkylidenimino para-substituted-phenyl phosphorochloridates and analogous thiophosphorochloridates are also disclosed.

FIELD OF THE INVENTION

This invention relates to new compositions of matter and particularly to a class of novel organic chemical compounds having utility as pesticides, especially for the control of various insects, bacteria and other undesirable microorganisms. The invention likewise relates to the preparation of these compounds and to their use as pesticides.

As used herein in the specification and claims, the terms "pesticide" and "pesticidal" are intended to refer to the killing and/or controlling infestation by insects, nematodes, mites, bacteria or other undesirable microorganisms. Thus, it will be appreciated that applications commonly termed insecticidal, nematocidal, bactericidal or the like are herein contemplated.

SUMMARY OF THE INVENTION

One class of novel compounds of this invention are identified as oximino esters of certain para-substituted-phenyl phosphates, thiophosphates and thiophosphonates represented by the formula:

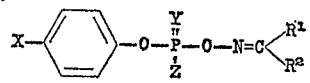

wherein X is an electronegative group which is nitro, cyano, azido, trihalomethyl, carboalkoxy or alkanesulfonyl; Y is O or S; $R^1$ or $R^2$ can be the same or different and are selected from the group consisting of H, alkyl radicals of 1–6 carbon atoms and phenyl, with the proviso that only one of $R^1$ and $R^2$ can be H; and Z is selected from the group consisting of alkyl and alkoxy radicals each having 1–6 carbon atoms, phenyl and

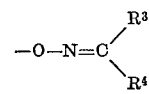

wherein $R^3$ and $R^4$ are as defined for $R^1$ and $R^2$.

These compounds are useful as chemical intermediates and are also effective as pesticidal compositions.

They are prepared by reacting under alkaline conditions, approximately equimolar proportions of an oxime which may be an aldoxime or ketoxime and either a phosphorochloridate, a thiophosphorochloridate or a phenylthiophosphonic chloride containing a para-substituted-phenoxy group. If the oxime employed is a ketoxime, the para-substituted-phenyl phosphorochloridate, thiophosphorochloridate or phenylthiophosphonic chloride reactant may likewise contain alkoxy or phenoxy substitution.

In the reaction, the oxime is optionally employed in its alkali metal salt form such as the sodium salt.

The oximino ester products of this invention are, in many instances, oily liquids at ambient temperature which cannot be distilled as they are readily decomposed at elevated temperatures.

Other novel compounds of this invention are alkylidenimino para-substituted-phenyl phosphorochloridates or analogous thiophosphorochloridates having the formula:

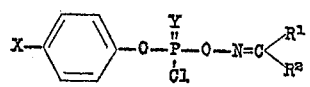

wherein X is nitro, cyano, azido, trihalomethyl, carboalkoxy or alkanesulfonyl; Y is O or S; and $R^1$ and $R^2$ can be the same or different and are selected from the group consisting of H, alkyl radicals of 1–6 C atoms and phenyl, with the proviso that only one of $R^1$ and $R^2$ can be H.

These compounds are prepared by reacting either a para-substituted-phenyl phosphorodichloridate or similarly substituted thiophosphorodichloridate with an aldoxime or a ketoxime under alkaline conditions such as in the presence of a tertiary amine. They are useful as intermediates in the preparation of the oximino ester compounds of this invention.

DESCRIPTION OF THE PREFERRED EMBODIMENTS

Disclosed compounds—names and structures

Specific illustrative compounds of this invention include the following:

Ethyl isopropylidenimino 4-nitrophenyl phosphate

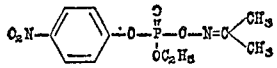

Ethyl isopropylidenimino 4-nitrophenyl thiophosphate

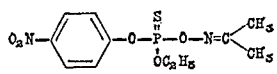

Diisopropylidenimino 4-nitrophenyl thiophosphate

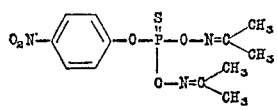

Isopropylidenimino methyl 4-nitrophenyl thiophosphate

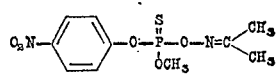

2-Butylidenimino ethyl 4-nitrophenyl thiophosphate

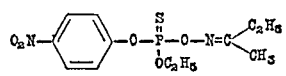

Ethyl ethylidenimino 4-nitrophenyl thiophosphate

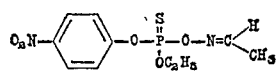

Isopropylidenimino 4-nitrophenyl phenylthiophosphonate

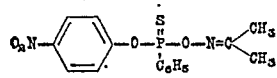

2-Butylidenimino 4-nitrophenyl phenylthiophosphonate

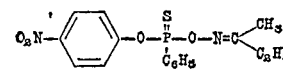

Ethylidenimino methyl 4-nitrophenyl thiophosphate

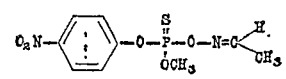

4-Cyanophenyl ethyl isopropylidenimino thiophosphate

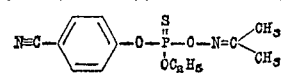

Ethyl α-methylbenzylidenimino 4-nitrophenyl thiophosphate

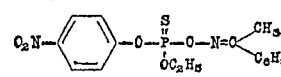

Ethyl α-phenylbenzylidenimino 4-nitrophenyl thiophosphate

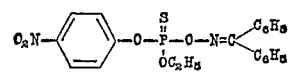

Preparation of disclosed compounds

The compounds of this invention, i.e., those within the scope of the foregoing generic structure, are prepared generally under alkaline conditions.

In one method, the compounds are obtained by reacting in approximately equimolar proportions an oxime derived from a ketone, i.e., a ketoxime, with either an alkyl para-substituted-phenyl phosphorochloridate, an alkyl para-substituted-phenyl thiophosphorochloride or a para-substituted-phenyl thiophosphorochloridate or a para-substituted-phenyl phenylthiophosphonic chloride, which compounds are represented collectively by the formula:

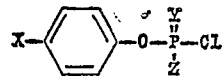

wherein X is nitro, cyano, azido, trihalomethyl, carboalkoxy or alkanesulfonyl; Y is O or S; and Z is selected from the group consisting of alkoxy radicals having 1–6 carbon atoms, phenyl radicals and para-substituted-phenoxy radicals. The ketoxime employed, which may be either an aliphatic ketoxime containing from 3 to 6 carbon atoms or an aromatic ketoxime of from 7 to 13 carbon atoms, is generally used as its alkali metal, e.g., sodium, salt. The reaction typically is conducted in an aromatic solvent, such as benzene, or in a lower alkyl ether, at ambient temperature for 4–16 hours.

The alkali metal salt of the ketoxime employed may be prepared typically at ambient temperature by reacting the particular oxime, a known, commercially available compound with an alkali metal, e.g., sodium, dispersed in an aromatic liquid medium, such as benzene or toluene. In practice, however, a dispersion of an alkali metal hydride, such as sodium hydride, in an aromatic liquid, is preferably employed.

However, when the particular oxime to be employed is derived from an aldehyde, i.e., an aldoxime such as acetaldoxime or benzaldoxime, the procedure as outlined hereinabove for preparing the compounds of this invention is somewhat modified. In such instance, a para-substituted-phenyl phosphorodichloridate or similarly substituted thiophosphorodichloridate which contains no alkoxy or penoxy substituent is reacted with an aldoxime at ambient temperature in the presence of a tertiary amine. The product of this reaction is an alkylidenimino para-substituted-phenyl phosphorochloridate or thiophosphorochloridate or a derivative thereof which may contain aryl substitution in the alkylidenimino group.

Any of the alkylidenimino para-substituted-phenyl phosphorochloridate or thiophosphorochloridate compounds prepared as intermediates in the practice of this invention are novel compounds having the formula:

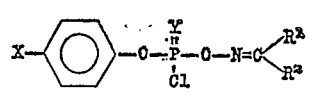

wherein X is nitro, cyano, azido, trihalomethyl, carboalkoxy or alkanesulfonyl; Y is O or S; and $R^1$ and $R^2$ can be the same or different and are selected from the group consisting of H, alkyl radicals of 1–6 C atoms and phenyl radicals, with the proviso that only one of $R^1$ and $R^2$ can be H.

Thereafter, the prepared oximino ester is reacted with an alkoxide of an alkali metal, such as sodium, at ambient temperature in a solvent such as benzene or ether for from 10 to 16 hours. The product obtained is an alkyl oximino ester compound of this invention. Of course, it is to be understood that it is possible to prepare compounds of the invention by this method when the oxime employed is derived from a ketone.

In the process of this invention, whether the oxime employed is derived from a ketoxime or an aldoxime, sodium chloride is obtained as a final by-product solid. To recover the desired oximono ester product, the reaction mixture is filtered and the sodium chloride is washed repeatedly with a solvent such as benzene or ether. The washings are combined with the filtrate. The desired product is finally recovered by evaporation of residual solvent under reduced pressure.

The compounds of this invention are all less than 5 percent soluble in water and greater than 5 percent soluble in acetone, cyclohexanone and xylene.

Application of the disclosed compounds

As described previously herein, the compounds of this invention are as a class, biologically active materials, particularly as insecticides, nematocides, miticides and/or bactericides.

While it is possible to apply these compounds in undiluted form to the plant or other material to be protected, it is usually desirable to apply them in admixture with either solid or liquid inert, pesticidal adjuvants. Thus, plants can be treated for insecticidal purposes, for example by spraying them with aqueous or organic solvent dispersions of the compounds. The choice of an appropriate solvent is determined largely by its compatibility with the compound employed, the concentration of active ingredient which it is desired to employ, by the volatility required in a solvent, the cost of the solvent and the nature of the material being treated.

The oximino esters of this invention can also be applied to plants and other materials along with inert solid fungicidal adjuvants or carriers typically employed heretofore in pesticidal formulations as adjuvants or carriers, e.g., diatomaceous earth, bentonite, cottonseed hulls, etc.

It is frequently desirable to incorporate a surface active agent in the pesticidal compositions of this invention. Such surface active agents are advantageously employed in both the solid and liquid compositions. The surface active agent can be anionic, cationic or nonionic in character and is selected from any of the classes of surface active agents, e.g., alkyl sulfonates, alkyl sulfates, alkaryl sulfonates, etc. now known in the art.

The solid and liquid formulations can be prepared in any suitable method. Thus, the active ingredient, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. These formulations may optionally contain small percentages of surface active agents, e.g., 0.5 to 1% of the total composition by weight.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% of a surface active agent by weight is also included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel compounds of the present invention may, in many instances, be employed in compositions containing other pesticides, more especially fungicides, insecticides and bactericides, e.g., phenothiazine, pyrethrum, rotenone, DDT, etc.

In order that those skilled in the art may more completely understand the present invention and the preferred methods by which the same may be carried into effect, the following specific examples may be offered:

EXAMPLE 1

Preparation of ethyl isopropylidenimino 4-nitrophenyl thiophosphate

A 500-ml., 3-necked, round-bottom flask is fitted with a mechanical stirrer, a thermometer, a reflux condenser with a drying tube, a pressure-equalized addition funnel and nitrogen inlet and outlet tubes. The sodium salt of acetone oxime is prepared by charging 1.8 g. (0.076 mole) of sodium hydride in 50 ml. benzene to the reaction flask and then adding with agitation 5.6 g. (0.076 mole of acetone oxime in 35 ml. of benzene. After hydrogen evolution ceases, 19.5 g. (0.069 mole) of ethyl 4-nitrophenyl thiophosphorochloridate is added dissolved in 45 ml. of benzene. The resulting reaction mixture is then stirred for four hours at ambient temperature. After this time period, the sodium chloride by-product is separated from the reaction mixture by filtration and is washed several times with benzene. The washings are added to the filtrate which is then evaporated to dryness under reduced pressure to yield 16.5 g. (75 percent of theoretical) of a reddish-brown oil. This product is identified as ethyl isopropylidenimino 4-nitrophenyl thiophosphate by elemental sulfur analysis: S (calculated), 10.1%; S (found), 10.3%. The compound is further tested for purity by Thin Layer Chromatography.

EXAMPLE 2

Preparation of ethyl 2-butylidenimino 4-nitrophenyl thiophosphate

Using similar equipment and procedure as outlined in Example 1 above, this compound is prepared using equimolar proportions of the sodium salt of 2-butanone oxime and ethyl 4-nitrophenyl thiophosphorochloridate in an ether medium. The product obtained in 84 percent yield is a yellow oil with a refractive index, $n_D^{26}$ of 1.5437. It is estimated to be 90 percent pure by Thin Layer Chromatography.

EXAMPLE 3

Preparation of ethyl α-methylbenzylidenimino 4-nitrophenyl thiophosphate

This compound is prepared as set forth in the previous examples, employing equimolar proportions of acetophenone oxime (as sodium salt) and ethyl 4-nitrophenyl thiophosphorochloridate. The reaction is conducted in an ether medium for 16 hours. The product obtained in 88 percent yield is a yellow oil, having a refractive index, $n_D^{26}$ of 1.532. It is estimated to be 90 percent pure as previously described.

EXAMPLE 4

Preparation of ethyl 4-nitrophenyl α-phenylbenzylidenimino thiophosphate

This compound is prepared, employing equimolar proportions of benzophenone oxime (sodium salt) and ethyl 4-nitrophenyl thiophosphorochloridate. Obtained in over 89 percent yield, the product is an orange-colored oil with a refractive index, $n_D^{26}$ of 1.5298.

EXAMPLE 5

Preparation of diisopropylidenimino 4-nitrophenyl thiophosphate

Using the same equipment as outlined in the previous examples, the sodium salt of acetone oxime is prepared as described in Example 1, using 3.6 g. (0.15 mole) of sodium hydride in 50 ml. benzene and 11.2 g. (0.15 mole) of acetone oxime in 50 ml. of benzene. A solution of 19.7 g. (0.073 mole) of 4-nitrophenyl thiophosphorodichloridate in 75 ml. of benzene is slowly added to the oxime solution maintained at ambient temperature. The reaction mixture is then stirred for six hours at ambient temperature, after which the sodium chloride is separated from the reaction mixture by filtration. The filtrate is evaporated under reduced pressure. The light tan solid product, which melts at 61–62° C., is identified as diisopropylidenimino 4-nitrophenyl thiophosphate by elemental analytical data as follows: Actual percent by weight, C, 42.1; H, 4.7; S, 9.6. Calculated percent by weight, C, 4.18; H, 4.68; S, 9.3.

EXAMPLE 6

Preparation of ethyl isopropylidenimino 4-nitrophenyl phosphate

Using the same type of equipment and following the general procedure as outline previously, a 0.027 mole quantity each of sodium hydride in 100 ml. benzene, acetone oxime in 50 ml. of benzene, and ethyl bis(4-nitrophenyl)phosphate in 100 ml. of chlorobenzene are reacted at ambient temperature for three hours. The reaction mixture is then diluted with 150 ml. of water. The resulting organic layer is leached successively with several water washes. After being dried over magnesium sulfate, the solvent is stripped under reduced pressure. The remaining material is extracted with n-pentane and is recovered as a yellow oil. This product, ethyl isopropylidenimino 4-nitrophenyl phosphate, is estimated to be greater than 95 percent pure by Thin Layer Chromatography.

EXAMPLE 7

Preparation of isopropylidenimino 4-nitrophenyl phenylthiophosphonate

This compound is prepared as described in the previous examples, by reacting acetone oxime (sodium salt) and 4-nitrophenyl phenylthiophosphonic chloride in an ether medium for 16 hours. The finished product, an amber liquid, is found to be the desired compound, at least 92 percent pure, by Thin Layer Chromatography.

EXAMPLE 8

Preparation of 2-butylidenimino 4-nitrophenyl phenylthiophosphonate

This compound is prepared employing butanone oxime (sodium salt) and 4-nitrophenyl phenylthiophosphonic chloride in an ether medium. The amber liquid product obtained is estimated to be 65 percent pure by Thin Layer Chromatography.

EXAMPLE 9

Preparation of ethyl isopropylidenimino 4-cyanophenyl thiophosphate

Using equipment as outlined in Example 1, 17.6 g. (0.07 mole) of 4-cyanophenyl thiophosphorodichloridate in 100 ml. of diethyl ether is charged to the flask. There is then slowly added a solution of 54 g. (0.07 mole) of acetone oxime and 7.1 g. (0.07 mole) of triethylamine in 50 ml. of ether, maintaining the temperature of the reaction mixture of 10° C. or lower. The reaction mixture is then allowed to warm to ambient temperature and is left with continued agitation for 16 hours. It is then filtered to remove the by-product solids. The solids are washed with several portions of ether. The filtrate contains the isopropylidenimino 4-cyanophenyl thiophosphorochloridate intermediate compound.

A slurry of 3.2 g. (0.07 mole) of sodium ethoxide (from reaction of ethanol and sodium hydride) in 75 ml. of ether, is prepared. The filtrate from the previous reaction is added to this slurry with agitation, after which the reaction mixture is stirred at ambient temperature for 10 hours. It is then filtered and the by-product sodium chloride is washed with several portions of ether, which washings are added to the initial filtrate. The total filtrate is then stripped of solvent under reduced pressure to yield 18.3 g. (73.3 percent yield) of a golden oil. This substance is estimated to be 75% of the desired product by Thin Layer Chromatography.

EXAMPLE 10

Preparation of methyl ethylidenimino 4-nitrophenyl thiophosphate

The equipment employed in this example is as outlined previously. The flask is charged with 25.0 g. (0.092 mole) of 4-nitrophenyl thiophosphorodichloridate in 125 ml. of diethyl ether. A solution of 3.45 g. (0.092 mole) of acetaldoxime and 9.3 g. (0.092 mole) triethylamine in 50 ml. of ether is slowly added to the flask, maintaining the temperature of the reaction mixture below 10° C. After addition is completed, the reaction mixture is warmed to ambient temperature and stirred for at least 10 hours. The mixture is then filtered to separate the by-product solids (triethylamine hydrochloride). These are washed with several portions of benzene and the washings are combined with the initial filtrate. The filtrate is then stripped of solvent to obtain the ethylidenimino 4-nitrophenyl thiophosphorochloridate product.

A slurry of 0.044 mole of sodium methoxide (prepared from methanol and sodium hydride) in 75 ml. benzene is prepared. At ambient temperature, a solution of 13.0 g. (0.044 mole) of the foregoing ethylidenimino 4-nitrophenyl thiophosphorochloridate product in ether is added slowly to the slurry with agitation. After addition is complete, the reaction mixture is stirred for 16 hours. It is then filtered to remove the by-product solids. The solids are washed with several portions of benzene and the total filtrate is stripped under reduced pressure. The methyl ethylidenimino 4-nitrophenyl thiophosphate product, an orange-colored oil, is obtained in about 65 percent yield.

EXAMPLE 11

Preparation of ethyl ethylidenimino 4-nitrophenyl thiophosphate

This compound is prepared as described in Example 10 for preparation of its methyl analog. To a slurry containing 0.044 mole of sodium ethoxide in 75 ml. of benzene is added an ether solution containing 0.044 mole of ethylidenimino 4-nitrophenyl thiophosphorochloridate. The desired product is recovered as outlined in Example 10. The product which is an amber-colored oil is obtained in about 54 percent yield.

EXAMPLE 12

Preparation of methyl isopropylidenimino 4-nitrophenyl thiophosphate

Using the same equipment as outlined previously, the reaction flask is charged with 12.5 g. (0.046 mole) of 4-nitrophenyl thiophosphorodichloridate in 75 ml. of diethyl ether. While maintaining the solution at 10° C., a solution of 3.4 g. (0.046 mole) of acetone oxime and 9.65 g. (0.046 mole) of triethylamine in 25 ml. of ether is added. The reaction mixture is then allowed to warm to ambient temperature and continuously agitated for 16 hours. The mixture is then filtered, the by-product solids are thoroughly washed with benzene. The total filtrate is stripped under reduced pressure to obtain the isopropylidenimin 4 - nitrophenyl thiophosphorochloridate intermediate.

An ether solution containing 13.6 g. (0.044 mole) of this compound is added rapidly at ambient temperature to a slurry of 0.044 mole of sodium methoxide in 75 ml. of benzene. The resulting mixture is then reacted with agitation for about 16 hours. The product is recovered as previously described. This compound, which is a dark amber oil, is obtained in about 90 percent yield. Its purity is determined by Thin Layer Chromatography.

EXAMPLE 13

Mexican Bean Beetle Leaf Spray Test

This test determines the insecticidal activity of the compound being tested against the Mexican bean beetle (*Epilachna varivestis*).

The test species is composed of one-day old larvae of the Mexican bean beetle. Paired fully expanded primary leaves excised from snap bean plants are maintained in Aquapics and sprayed with 50 ml. of the test formulation in a turntable spray hood. This test formulation contains 0.05 g. chemical (or 0.05 ml. if a liquid), 4.0 ml. acetone containing 0.25% Triton X-155 by volume and 96.0 ml. deionized water. The concentration of toxicant in this formulation is 500 parts per million. Lower concentrations of toxicant are obtained by diluting this formulation with prescribed quantities of the formulation minus the toxicant.

The plants are sprayed by means of a DeVilbiss paint spray gun (Type CH), calibrated to deliver 45 ml. water in 30 seconds at 30 pounds air pressure per square inch, while the plants are being rotated on a turntable in a hood.

After the chemical deposit on the leaves is dry, the paired leaves are separated, and only one of the leaves, selected at random, is used for the test. This leaf is placed onto solidified 1.5% water agar (15 ml. per 100 mm. polystyrene disposable Petri dish) and is infested with 10 one-day old Mexican bean beetle larvae. These are held at 72° F. for three days when mortality and feeding inhibition are determined. The feeding inhibition is an indication of the repellent properties of the test material. Results of insecticidal activity are given in the following table:

| Compound tested | Concentration, p.p.m. | Percent mortality |
|---|---|---|
| Ethyl isopropylidenimino 4-nitrophenyl thiophosphate | 64 | 90 |
|  | 32 | 70 |
|  | 16 | 30 |
|  | 8 | 20 |
| Ethyl isopropylidenimino 4-nitrophenyl phosphate | 8 | 100 |
|  | 4 | 50 |
|  | 2 | 20 |
| Ethyl α-methylbenzylidenimino 4-nitrophenyl thiophosphate | 250 | 90 |
|  | 218 | 40 |
|  | 64 | 10 |
| Isopropylidenimino 4-nitrophenyl phenylthiophosphonate | 500 | 60 |
|  | 250 | 50 |
| 2-butylidenimino ethyl 4-nitrophenyl thiophosphate | 128 | 100 |
|  | 64 | 20 |
| Diisopropylidenimino 4-nitrophenyl thiophosphate | 128 | 100 |
|  | 64 | 60 |
|  | 32 | 20 |

EXAMPLE 14

Red-banded leaf roller leaf spray test

This test determines the insecticidal activity of compounds of the invention against the red-banded leaf roller, *Argyrotaenia velutinana*.

The test species is composed of newly hatched larvae of the red-banded leaf roller. Paired fully expanded primary leaves excised from snap bean plants are maintained in Aquapics and sprayed with 50 ml. of the test formulation in a turntable spray hood as described previously. The test formulation contains 0.05 g. chemical (or 0.05 ml. if a liquid), 4.0 ml. acetone containing 0.25% Triton X-155 by volume and 96.0 ml. deionized water. The concentration of toxicant in this formulation is 500 parts per million. Lower concentrations of toxicant are obtained by diluting the formulation with added quantities of the basic formulation minus toxicant.

After the chemical deposit on the leaves is dry, the paired leaves are separated. One leaf is placed onto solidified 1.5% water agar (15 ml. per 100 mm. polystyrene disposable Petri dish). Ten newly hatched red-banded leaf roller larvae are transferred to the leaf and the Petri dish is covered. These are held at 72° F. for three days when mortality is determined. Results of insecticidal activity are given in the following table:

| Compound tested | Concentration, p.p.m. | Percent mortality |
|---|---|---|
| 2-butylidenimino ethyl 4-nitrophenyl thiophosphate | 64 | 100 |
|  | 32 | 69 |
| Diisopropylidenimino 4-nitrophenyl thiophosphate | 64 | 100 |
|  | 32 | 60 |
|  | 16 | 20 |
| Ethyl isopropylidenimino 4-nitrophenyl thiophosphate | 64 | 100 |
|  | 32 | 100 |
|  | 16 | 29 |
|  | 8 | 6 |
| Ethyl isopropylidenimino 4-nitrophenyl phosphate | 16 | 100 |
|  | 8 | 87 |
|  | 4 | 67 |
|  | 2 | 6 |
| Ethyl α-methylbenzylidenimino 4-nitrophenyl thiophosphate | 250 | 80 |
| Isopropylidenimino 4-nitrophenyl phenylthiophosphonate | 250 | 80 |

EXAMPLE 15

Housefly spray test

This test determines the insecticidal activity of compounds of the invention against adult houseflies, *Musca domestica*.

A basic formulation for this test is as described in Examples 13 and 14 with the concentration of toxicant being 500 p.p.m. Lower concentrations are obtained by diluting this formulation with more of the basic formulation minus toxicant.

Cages consisting of cylindrical screens 1½ inches in diameter by 4 inches long are fabricated from 20-mesh stainless steel screening. One end is closed with a size D polyurethane foam tube plug. Ten adult houseflies (male and female), anesthetized with carbon dioxide, are counted into each cage, and the open end is then closed with a second foam plug. The cages are inserted into a wire stand mounted on the turntable in the spray hood and the insects are sprayed with 50 ml. of the formulation as previously described. The flies are supplied a dextrose solution by draping a paper wick over the outside of the screen cylinder. They are able to feed and drink by passing their probosci through the openings in the screen. Mortality data are recorded three days after treatment. Results of insecticidal activity are given in the following table:

| Compound tested | Concentration, p.p.m. | Percent mortality |
|---|---|---|
| Ethyl ethylidenimino 4-nitrophenyl thiophosphate | 64 / 32 | 80 / 30 |
| Ethyl isopropylidenimino 4-nitrophenyl phosphate | 32 / 16 | 80 / 30 |
| Ethyl isopropylidenimino 4-nitrophenyl thiophosphate | 64 / 32 | 100 / 20 |
| Diisopropylidenimino 4-nitrophenyl thiophosphate | 64 / 32 | 100 / 50 |

EXAMPLE 16

Bean aphid spray test

This test determines the insecticidal activity of compounds of this invention against the bean aphid *Aphis fabae*. For each chemical tested, a basic test formulation containing 500 p.p.m. of toxicant is prepared as described in Example 13. The bean aphid is cultured on nasturtium plants var. Tall Single, no attempt being made to select insects of a given age in these tests. One day before a scheduled evaluation, nasturtiums growing in 2½-inch clay pots are thinned to one plant per pot. These test plants are then infested by excising heavily infested leaves from the colony and hanging these leaves in the crotch of the test plants. As the leaves desiccate overnight, the aphids migrate to the test plants, and populations of 100 to 200 aphids per plant are easily attained.

For the test, 50 ml. of the test formulation (500 p.p.m.) is sprayed as previously described onto the plants being rotated on a turntable in a hood. Lesser concentrations of the test chemical are applied with portions of the basic test formulation diluted as stated previously. Holes are punched in pieces of paraffin-type plastic film, 4 inches square. A slit is then cut in each piece, extending to the holes in the center. The film is then wrapped snugly around the stem of the sprayed infested plant, overlapping the edges of the slit and pinching them together to form an inverted cone which serves as a receptacle to catch aphids falling from the plant foliage. The pot-plant-film test units are then stood under fluorescent lights in a tray and given bottom watering for the duration of the test. Dead aphids fall into the plastic film assemblies where they can easily be counted. Percentage mortality is determined three days after spraying. Using this procedure, the following results are obtained:

| Compound | Dosage, p.p.m. | Percent aphid mortality |
|---|---|---|
| Ethyl isopropylidenimino 4-nitrophenyl thiophosphate | 8 / 4 / 2 | 100 / 92 / 78 |
| 2-butylidenimono ethyl 4-nitrophenyl thiophosphate | 64 / 32 | 100 / 90 |
| Ethylidenimino methyl 4-nitrophenyl thiophosphate | 64 / 32 | 71 / 100 |
| Diisopropylidenimino 4-nitrophenyl thiophosphate | 16 / 8 | 89 / 81 |
| Ethyl isopropylidenimino 4-nitrophenyl phosphate | 8 / 4 / 2 | 100 / 74 / 37 |

EXAMPLE 17

Red spider mite spray test

This test determines the insecticidal activity of compounds of this invention against the red spider mite, *Tetranychus sp.* For each chemical, a basic test formulation is prepared as described in Example 13. The stock culture of mites is maintained on snap bean foliage. Approximately 18 to 24 hours before testing, mites are transferred from the stock culture by pieces of infested leaves which are placed on the primary leaves of two Lima bean plants (var. Sieva) grown in 2½-inch pots. As leaf fragments dry, the mites migrate to the uninfested leaves. Immediately before spraying, the leaf fragments are removed from the foliage.

For the test, 50 ml. of the test formulation (500 p.p.m.) is sprayed as previously described onto the bean plants as they are rotated on a turntable in a hood. Lesser concentrations of the test chemical are applied using portions of the basic test formulation diluted with additional quantities of the basic formulation which does not contain the toxicant. After three days, two of the four leaves treated are examined under a binocular stereoscopic microscope and the mortality determined. Should a compound be an effective miticide, the other two leaves are available to obtain information on the residual activity of the formulation. Using this procedure, the following results are obtained:

| Compound | Dosage, p.p.m. | Percent mite mortality |
|---|---|---|
| Ethyl isopropylidenimino 4-nitrophenyl phosphate | 32 / 16 / 8 | 91 / 55 / 7 |
| Ethyl isopropylidenimino 4-nitrophenyl thiophosphate | 32 / 16 | 88 / 38 |
| 2-butylidenimino 4-nitrophenyl thiophosphate | 32 | 62 |

EXAMPLE 18

Root-knot nematocide test

This test is an evaluation of the effectiveness of ethyl isopropylidenimino 4-nitrophenyl thiophosphate against the root-knot nematode Meloidogyne spp.

Composted greenhouse soil, diluted by one-third with clean washed sand, is placed in 4-inch clay pots and infested with one to three grams of knotted or galled tomato roots. A test formulation is prepared which contains 0.056 g. of the test chemical (or 0.56 ml. if a liquid), 1.0 ml. acetone containing 0.25% Triton X–155 by volume and 24.0 ml. deionized water. Application of 25 ml. of this formulation to the 4-inch pots provides a dosage equivalent to 64 pounds per acre. More dilute dosages of chemical are applied by using prescribed quantities of the test formulation diluted with water.

After treatment, the soil, inoculum, and chemical in each test pot are thoroughly mixed in a 6" x 3" x 12" polyethylene bag, returned to the pot, and the mixture incubated for one day at 20° C. and constant moisture. After incubation, two seedling Rutgers tomato transplants are set in each pot. Roots are removed from the soil after three weeks of growth and rated for gall (root-knot nematode infection) formation. A rating of infection from 0 to 10 is recorded: 0=no galls or complete control and 10=heavily galled roots comparable to controls. Each of the root systems is rated separately and the average is multiplied by 10 and subtracted from 100 to give percent nematode control. Using this procedure, the effectiveness of ethyl isopropylidenimino 4-nitrophenyl thiophosphate is as follows:

| Concentration, lbs./acre: | Percent control root-knot nematodes |
|---|---|
| 16 | 100 |
| 8 | 90 |
| 4 | 85 |
| 2 | 50 |

EXAMPLE 19

Test formulations are examined for ability to inhibit the colonial growth of *Erwinia amylovora* (E. a.), *Xanthomonas phaseoli* (X. p.), *Staphylococcus aureus* (S. a.), and *Escherichia coli* (E. c.) at various concentrations. The basic test formulation contains 0.125 g. of the test chemical (or 0.125 ml. if a liquid), 4.0 ml. acetone containing 0.25% Triton X-155 by volume and 96.0 ml. deionized water, the concentration of toxicant in this formulation being 1250 parts per million.

Two ml. of each formulation is dispensed into a test tube which is then placed into a water bath maintained at 44° C. From a stock preparation (also held at 44° C.), 8 ml. of 20-percent nutrient agar is added to the test tube giving a 1:5 dilution or a final concentration of 250 p.p.m. chemical in the agar. The contents of the test tube are then thoroughly mixed, while still warm, with the aid of a Vortex type mixer and immediately poured into a sterile polystyrene Petri dish (100× 15 mm.). After the agar in the plate is set, suspensions of each organism are simultaneously streaked onto the surface of the agar. After the plate is inoculated, it is incubated 24 to 48 hours at 30° C., after which time each organism is rated visually for growth inhibition by the candidate chemical. Estimates of percent growth inhibition are relative to growth of streak colonies in control plates obtained during individual tests. Using this procedure, the following results are obtained:

| Compound | Concentration, p.p.m. | Percent control | | | |
|---|---|---|---|---|---|
| | | E.a. | X.p. | S.a. | E.c. |
| Ethyl ethylidenimino 4-nitrophenyl thiophosphate | 250 | 100 | 100 | 100 | 0 |
| Ethylidenimino methyl 4-nitrophenyl thiophosphate | 250 | 100 | 100 | 100 | 0 |

It is to be understood that although the invention has been described with specific reference to particular embodiments thereof, it is not to be so limited, since changes and alterations therein may be made which are within the full intended scope of this invention as defined by the appended claims.

What is claimed is:
1. As a novel composition of matter, a compound of the formula:

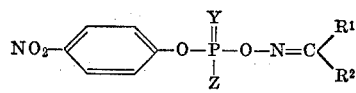

wherein Y is O or S; $R^1$ and $R^2$ are the same or different and are selected from the group consisting of H, alkyl radicals of 1–6 carbon atoms and phenyl radicals, with the proviso that only one of $R^1$ and $R^2$ can be H; and Z is selected from the group consisting of alkyl and alkoxy radicals each having 1–6 carbon atoms, phenyl, Cl and

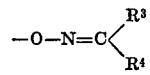

wherein $R^3$ and $R^4$ are as defined for $R^1$ and $R^2$.

2. The compound of claim 1 which is an oximino ester of a para-nitro-phenyl alkyl phosphate.
3. The compound of claim 1 which is an oximino ester of a para-nitro-phenyl alkyl thiophosphate.
4. The compound of claim 1 which is an oximino ester of a para-nitro-phenyl phenylthiophosphonate.
5. The compound of claim 1 which is ethyl isopropylidenimino 4-nitrophenyl thiophosphate.
6. The compound of claim 1 which is ethyl isopropylidenimino 4-nitrophenyl thiophosphate.
7. The compound of claim 1 which is diisopropylidenimino 4-nitrophenyl thiophosphate.
8. The compound of claim 1 which is isopropylidenimino methyl 4-nitrophenyl thiophosphate.
9. The compound of claim 1 which is 2-butylidenimino ethyl 4-nitrophenyl thiophosphate.
10. The compound of claim 1 which is ethyl ethylidenimino 4-nitrophenyl thiophosphate.
11. The compound of claim 1 which is isopropylidenimino 4-nitrophenyl phenylthiophosphonate.
12. The compound of claim 1 which is 2-butylidenimino 4-nitrophenyl phenylthiophosphonate.
13. The compound of claim 1 which is ethylidenimino methyl 4-nitrophenyl thiophosphate.
14. The compound of claim 1 which is ethyl α-methylbenzylidenimino 4-nitrophenyl thiophosphate.
15. The compound of claim 1 which is ethyl α-phenylbenzylidenimino 4-nitrophenyl thiophosphate.
16. The compound of claim 1 which is isopropylidenimino 4-nitrophenyl thiophosphorochloridate.
17. The compound of claim 1 which is ethylidenimino 4-nitrophenyl thiophosphorochloridate.

References Cited

UNITED STATES PATENTS 2,816,128  12/1957  Allen _____ 260—944 X
3,094,406  6/1963  Price et al. _____ 260—944 X JOSEPH REBOLD, Primary Examiner A. H. SUTTO, Assistant Examiner U.S. Cl. X.R.

260—940, 968, 973; 424—210, 211

UNITED STATES PATENT OFFICE
CERTIFICATE OF CORRECTION

Patent No. 3,663,664          Dated   May 16, 1972

Inventor(s) Lawrence A. Retallick, Lawrence E. Limpel and Henry Bluestone

It is certified that error appears in the above-identified patent and that said Letters Patent are hereby corrected as shown below:

In Column 4, at the beginning of line 1, after "para-", delete the balance of the line.

Column 6, line 54, the value "1.532", should be --1.5372--.

Column 7, line 10, the value "4.18, should be --41.8--.

Column 12, line 53, the value "0.56 ml", should be --0.056 ml--

Claim 5, line 2, change "thiophosphate" to --phosphate--.

Signed and sealed this 28th day of November 1972.

(SEAL)
Attest:

EDWARD M. FLETCHER, JR.
Attesting Officer

ROBERT GOTTSCHALK
Commissioner of Patents